United States Patent [19]

Richter

[11] 4,170,243

[45] Oct. 9, 1979

[54] PRESSURE RELIEF VALVE FOR PRODUCT CONTAINERS

[75] Inventor: Simon J. Richter, Marietta, Ga.

[73] Assignee: The Coca-Cola Company, Atlanta, Ga.

[21] Appl. No.: 938,717

[22] Filed: Aug. 31, 1978

Related U.S. Application Data

[62] Division of Ser. No. 739,397, Nov. 18, 1976, Pat. No. 4,140,148.

[51] Int. Cl.² ............................................. F16K 15/02
[52] U.S. Cl. .................................................. 137/240
[58] Field of Search ............... 220/203, 206, 208, 209; 251/337; 137/238–241, 516.29, 540, 543.17, 543.19, 543.21

[56] References Cited

U.S. PATENT DOCUMENTS

| | | | |
|---|---|---|---|
| 1,959,644 | 5/1934 | Richardson | 137/543.19 X |
| 2,254,209 | 9/1941 | Buttner et al. | 137/540 |
| 2,595,012 | 4/1952 | Smith | 251/332 X |
| 2,683,464 | 7/1954 | St. Clair | 137/540 |
| 2,904,065 | 9/1959 | Butlin | 137/543.19 X |
| 3,404,699 | 10/1968 | Arons | 137/73 |
| 3,463,185 | 8/1969 | Oliver et al. | 137/516.29 |

FOREIGN PATENT DOCUMENTS

1456510 9/1966 France .................................. 137/543.19

Primary Examiner—Martin P. Schwadron
Assistant Examiner—Richard Gerard
Attorney, Agent, or Firm—W. Dexter Brooks

[57] ABSTRACT

A combined relief valve and lid structure is provided for pre-mix beverage and syrup containers having a tubular body enclosing a relief port in the lid, an annular valve seat surface about the relief port and raised higher than the lid surface and drain ports extending from the valve seat surface down to the lid surface to enhance drainage of the entire internal portion of the valve body. The relief port is closed by a spring biased poppet and has a biasing spring held in place in the top of the tubular body by a one-way detent and retainer clip arrangement which must be destroyed to remove it from the valve body to gain access to the relief valve poppet. The valve cannot be tampered with unless this retainer clip for the valve spring is destroyed. The retainer clip is ported to permit cleaning steam or other fluid to enter the top of the valve and drain off through the drain ports without accumulation of condensate or residual fluid in the valve. The poppet is basically cylindrical with relieved vertical side portions or flats to enhance drainage and exposure of the valve surface for cleaning.

6 Claims, 12 Drawing Figures

PRESSURE RELIEF VALVE FOR PRODUCT CONTAINERS

This application is a divisional of copending application Ser. No. 739,397, filed on Nov. 18, 1976 and now U.S. Pat. No. 4140148.

FIELD OF THE INVENTION

This invention relates to pressure relief valves and more particularly, to calibrated pressure relief valves for product containers which are formed in or integrated with the lid of such containers.

BACKGROUND OF THE INVENTION

In shipping containers for pre-mixed beverage and syrup products and other liquid products in which it is desirable to maintain sterile and safe conditions, it is highly desirable to employ pressure relief valves in the lids of such containers. In fact, it is a voluntary industry standard of the N.S.D.A. to provide pressure relief valves in soft drink or other beverage containers which will relieve 30 standard cubic feet/minute of carbon dioxide at a cracking pressure not to exceed 130 psig. This requirement or voluntary standard is to preclude over-pressurization of containers which could result in explosion and damage.

In designing such relief valves for this purpose, however, there are a number of criteria which such valves must meet in order to be acceptable. For example, it is highly desirable that such a relief valve be designed in such a way that it can be washed in commercially available washing equipment. For example, the top of the valve should be open to allow jets of hot liquid to enter the valve body and therefore clean and flush the inner components of the valve.

The housing of the valve, the valve poppet, seat and other components should be constructed such that no liquid can accummulate within the valve structure and encourage bacterial growth.

The valve should also be tamper proof such that any override of the normal relief function of the valve will result in the destruction thereof making it obvious that the container has possible been adulterated or at the least, tampered with.

Finally, the valve should be compatible with the lid structure for such containers such that it can be integrally incorporated in the lid structure.

It is, therefore, an object of the present invention to provide a new and novel pressure relief valve and lid structure for pre-mixed beverage and syrup containers and the like.

It is another object of the present invention to provide a new and novel pressure relief valve for beverage and syrup containers which is readily adaptable to sterilization and which will be self draining when subjected to the action of sterilizing fluids.

Yet another object of the present invention is to provide a new and novel pressure relief valve for pre-mixed beverage and syrup containers which is integrally formed in the lid of such containers and which is tamper proof.

These and other objects of the present invention will become more fully apparent with reference to the following specification and drawings which relate to preferred embodiments of the invention.

SUMMARY OF THE INVENTION

Figure 1:
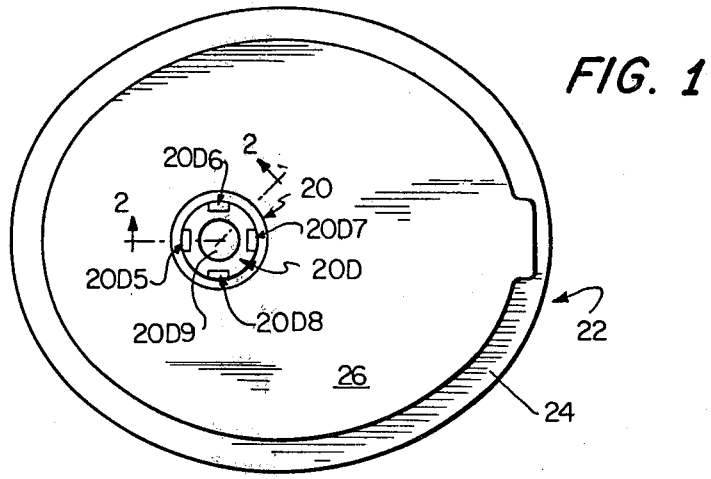
FIG. 1 is a top plan view of a container lid and pressure relief valve structure of the present invention.
Figure 12:
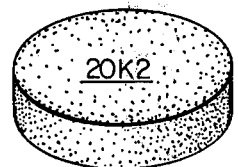
FIG. 12 is a perspective of a resilient sealing disk of the present invention.

The relief valve of the present invention cooperates with a container lid having a valve port defined through the surface thereof with a raised annular curb around the port defining a valve seat surface projecting above an intermediate annular surface which is raised slightly above the remainder of the surface of the lid.

In another embodiment of the invention, the port in the container lid is of a size to receive an integral valve body and valve seat having the valve port in the valve body structure but with the raised annular curb and valve seat surface and intermediate surface maintained above the remainder of the surface of the lid surrounding the valve port therein.

A nylon or other preferrably non-metalic valve poppet carries a resilient sealing disk in a truncated cylindrical cavity overlying the raised annular curb of the valve relief port is spring biased to engage the sealing disk with the valve seat on the raised annular curb by a calibrated compression spring. This compression spring is maintained in place above the valve poppet in a stainless steel tubular valve body by means of a frangible snap-in retainer means which must be broken in order to remove the relief valve from the container. This retainer means is insertable into the upper end of the tubular valve body, the latter including a plurality of internal grooves and recesses which are of a one-way nature and which cooperate with a plurality of spring fingers or detents integral with the retainer means to permit one-way access of the retainer means and lock the same in place in the valve body such that only breakage of the retainer means will permit its removal.

The tubular valve body is provided with drain ports having their lowermost extremities positioned beneath the level of the annular valve seat and its surrounding intermediate surface and extending radially outward therefrom to permit cleaning fluid or condensation to drain completely away from the valve seat surface and intermediate surface and preclude the formation of bacteria adjacent the seat and intermediate surface elsewhere and within the valve body.

Cleaning is further facilitated by the fact that co-axial with the central line of the compression spring, the spring retaining clip is ported and relieved with a central axial bore such that hot cleaning fluid or steam may be injected into the valve assembly through the spring retaining means and thoroughly sterilize all of the components of the relief valve which are exterior to the container lid into which the relief valve is integrated.

In one preferred embodiment of the invention, the tubular valve body is merely rested upon two arcuate upset portions in the container lid and the raised annular curb and its integral valve seat surface are integrally formed in the container lid such that no special machining other than the one-way grooves and recesses for holding the retaining means for the compression spring need be machined or formed into the valve body.

The valve poppets may either be basically cylindrical, triangular or rectangular in overall shape and have a truncated cylindrical cavity therein containing a resilient sealing disk which engages the valve seat surface on the raised annular curb to seal the valve port.

The valve poppet includes an annular shoulder depending beneath the sealing disc to engage the intermediate surface adjacent the valve seat upon sufficient compression of said sealing disk.

The sealing disk and lower annular shoulder of the valve poppet cooperate, respectively, with the annular valve seat (and its raised curb) and the intermediate surrounding surface to apportion the counter forces required to oppose the force of the valve spring. The force exerted by the spring is taken up partially by the compression of the resilient sealing disc against the valve seat and curb and the remainder by the lower annular shoulder of the poppet engaging the surrounding intermediate surface or web in the lower portion of the valve body. The ratio of the two counter forces is controlled such that the load assumed by the sealing disk is just sufficient to maintain an effective seal at pressures just below and up to the desired cracking pressure. This precludes sticking and resultingly higher cracking pressures than desired. Thus, the accuracy and reliability of the relief valve is enhanced.

DETAILED DESCRIPTION OF THE DRAWINGS

Referring to FIG. 1 of the drawings, a relief valve 20 of the present invention is shown as mounted integrally with a lid 22, the latter having a container rim engaging bead or peripheral curl 24 and a central web or container covering portion 26 in which the relief valve 20 is mounted.

Figure 2:
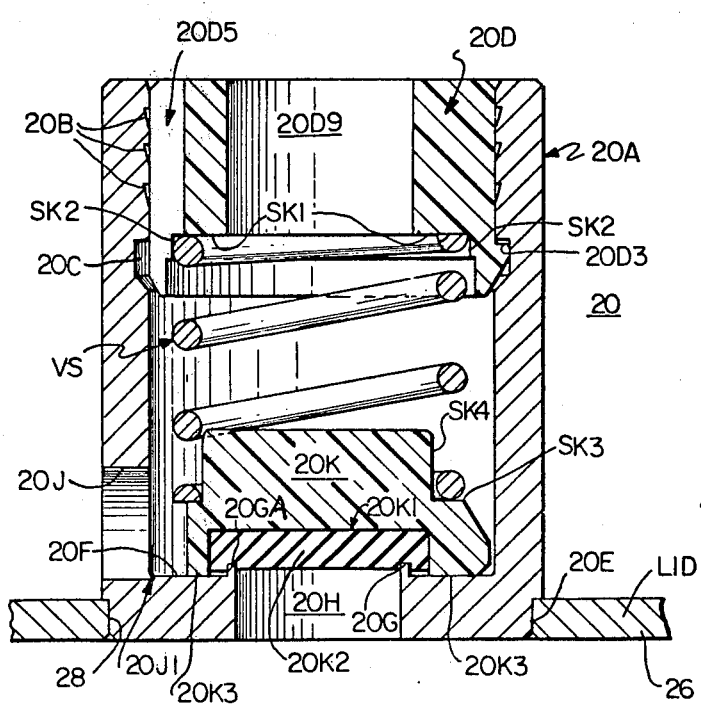
FIG. 2 is a cross section taken along 2—2 of FIG. 1 illustrating one embodiment of the valve of the present invention in enlarged detail.
Figure 3:
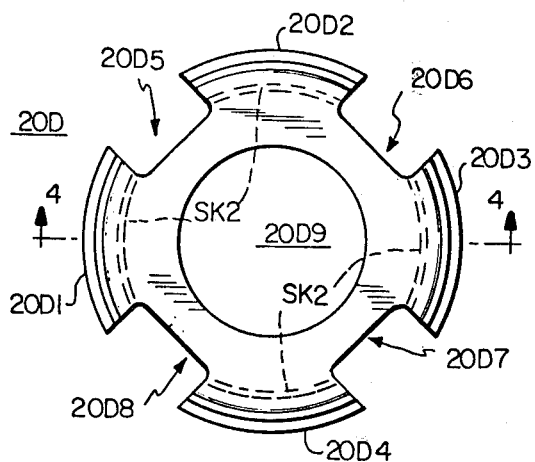
FIG. 3 is a top plan view of a valve spring retainer clip of the present invention.
Figure 5:
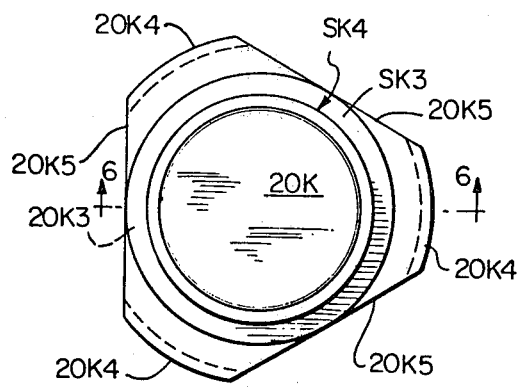
FIG. 5 is a top plan view of a preferred embodiment of a valve poppet of the present invention.
Figure 4:
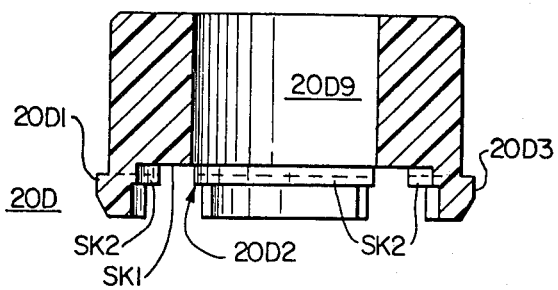
FIG. 4 is a cross section taken along line 4—4 of FIG. 3.
Figure 6:
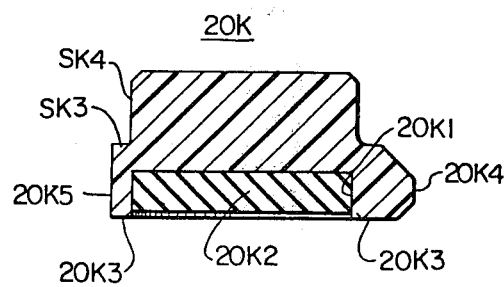
FIG. 6 is a cross section taken along line 6—6 of FIG. 5.

With further specific reference to FIGS. 2, 3 and 4, the relief valve 20 is shown as comprising a stainless steel tubular valve body 20A having the outer end thereof internally relieved in the provision of one-way retaining grooves 20B and a one-way retaining recess 20C at the innermost extremity of the retaining grooves 20B for receiving a nylon spring retaining clip 20D which, as shown in FIG. 3, has a basically cruciform top plan configuration. This configuration includes outboard arcuate detents 20D1–20D4 alternately dispersed about the periphery of the retaining clip 20D with radially relieved gaps 20D5–20D8. The spring retaining clip 20D is further provided with an axial and centrally located enlarged bore 20D9 which is sized to receive cleaning liquid or steam into the valve body 20A as will be hereinafter more fully described.

The spring retaining clip 20D is made of molded nylon or the like and its cruciform shape enables it to be forced into the uppermost end of the valve body 20A past the one-way retaining grooves 20B by distortion of the annular segmental detents 20D1–20D4 to ultimately permit the latter to snap into the retaining recess 20C which is conformally shaped to receive them.

In this regard, the upper or reverse direction corners of the recess 20C are substantially right angular in configuration as are the top detent surfaces of the detents 20D1–20D4.

Also, to permit more facile entry of the spring retainer clip into the top of the stainless steel body 20A, the lowermost outer extremities of the arcuate detents 20D1–20D4 are bevelled and a similar bevelled edged is provided on the innermost extremity of the conformal retaining groove 20C.

The lowermost portion of the spring retainer clip 20D is counterbored co-axially with the axial bore 20D9 as generally indicated by the dotted lines in FIG. 3 and in cross section in FIG. 4 in the provision of an annular spring keeper surface SK1 surrounding the axial bore 20D9 and also providing, by way of the counterbore an interrupted arcuate peripheral shoulder SK2 which is sized to receive a snug or juxtaposed engagement one end of the valve spring VS.

The container cover or central web portion 26 of the lid 22 is drilled or otherwise relieved to form a valve receiving port 28 into which a stepped-down end 20E of the stainless steel tubular valve body 20A is press-fitted or welded.

The stepped down end 20E of the cylindrical valve body 20A is provided with a web or flange which extends across the valve body parallel to the lid surface 26 but which at its inboard extremity is raised above the lid surface 26 in a provision of an annular intermediate web surface 20F surrounding a raised annular curb 20G. The valve seat surface 20GA is an annular surface defined by the upper extremity of the raised annular curb 20G which defines the perimeter of a relief bore 20H defined in the intermediate web.

A drain port or plurality of drain ports 20J extends radially through the wall of the valve body 20A immediately adjacent the annular intermediate web 20F with the lowermost extremity of the drain ports 20J positioned below the web 20F and the valve seat 20GA as indicated at 20J1 in FIG. 2.

The shape of the drain ports 20J is such that there are no upstanding liquid retaining edges at the vicinity of the demarcation point 20J1 between the lowermost extremity of the said ports and the intermediate web 20F.

To complete the valve assembly, a valve poppet 20K having a truncated cylindrical bore 20K1 therein, which is concentrically and externally disposed with respect to the upstanding annular curb 20G surrounding the relief valve port 20H, and which carries a resilient sealing disk 20K2 which compressibly and resiliently engages the valve seat 20GA on the curb 20G to seal off the port 20H. An annular flat bottom shoulder portion 20K3 of the valve poppet 20K surrounding and depending beneath the sealing disc 20K2 mates wih the intermediate web 20F upon compression of the sealing disc 20K2 under the force of the valve spring VS.

On the uppermost end of the valve poppet 20K is provided an annular shoulder SK3 which is horizontally disposed and which is a spring keeper surface for the lowermost end of the valve spring VS. An upstanding reduced diameter portion SK4 is also provided in the valve poppet 20K which extends above the annular shoulder SK3 internally of the valve spring VS and serves as a lateral keeper for the lowermost end of the said valve spring VS.

Referring jointly to FIGS. 2, 5, 6 and 12, the valve poppet 20K is shown in a first preferred embodiment as being basically triangular in top plan view and having arcuate apices 20K4 interconnected by flat side wall surfaces 20K5 which are disposed along cords of the circle defining the outer periphery of the apices 20K4, the latter being all symmetrical one with the other.

Thus, there is provided a valve poppet configuration around which cleaning liquid or steam can readily flow and around which drying air or the like can readily circulate such that no fluid will be trapped within the bore of the valve body 20A by the poppet 20K, the latter being dimensioned such that it does not engage the interior bore of the valve body 20A but rides relatively freely therein against the action of the valve spring VS.

Figure 7:
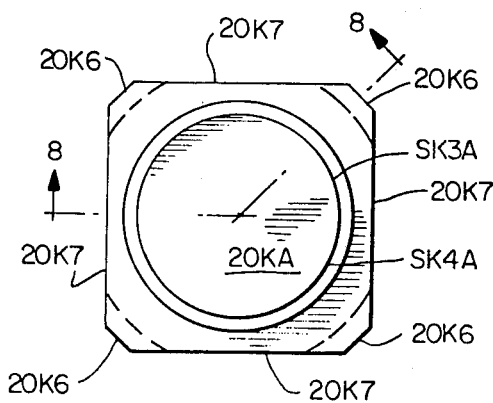
FIG. 7 is a top plan view of another preferred embodiment of a valve poppet of the present invention.
Figure 8:
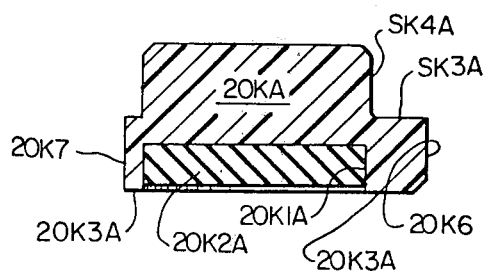
FIG. 8 is a cross section taken along line 8—8 of FIG. 7.

With reference to FIGS. 7 and 8, an alternate form of the valve poppet 20KA is illustrated which includes the annular keeper SK3A and the lateral keeper and extension SK4A (all like components to the valve poppet 20K being identified by like designations with the suffix A), the truncated cylindrical bore 20K1A, the resilient sealing disk 20K2A and the intermediate web engaging lower annular surface 20K3A. In top plan, however, the valve poppet 20KA is basically square with four rounded or arcuate outboard corners 20K6 interconnected by flat vertical surfaces 20K7 lying along cords of the arc or circle defining the peripheries of the outboard corners 20K6. Here again, as in the embodiment of FIGS. 5 and 6, the poppet 20KA at its maximum dimension (across the diametrically opposed outboard corners 20K6) is less than the internal diameter of the valve body 20A such that the valve poppet 20KA will ride within the valve body 20A relatively freely against the action of the valve spring VS.

The end result of the basically square shape of the valve poppet 20KA is the same as that with the basically triangular shape, namely, that the relieved side portions 20K7 provide room for both the cleaning liquid or steam and drying air to circulate around the valve poppet within the confines of the valve body 20A to thereby preclude any collection of liquid and resulting bacterial growth within the valve body 20A.

Figure 11:
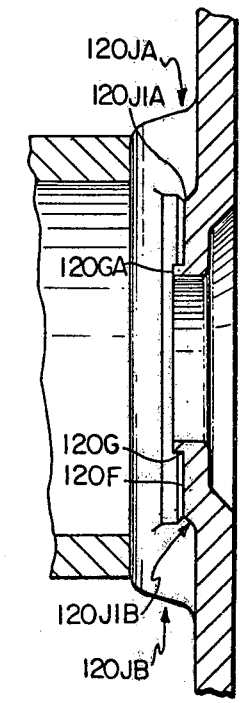
FIG. 11 is another detailed cross section illustrating the valve seat of FIGS. 9 and 10 taken along line 11—11 of FIG. 9.
Figure 9:
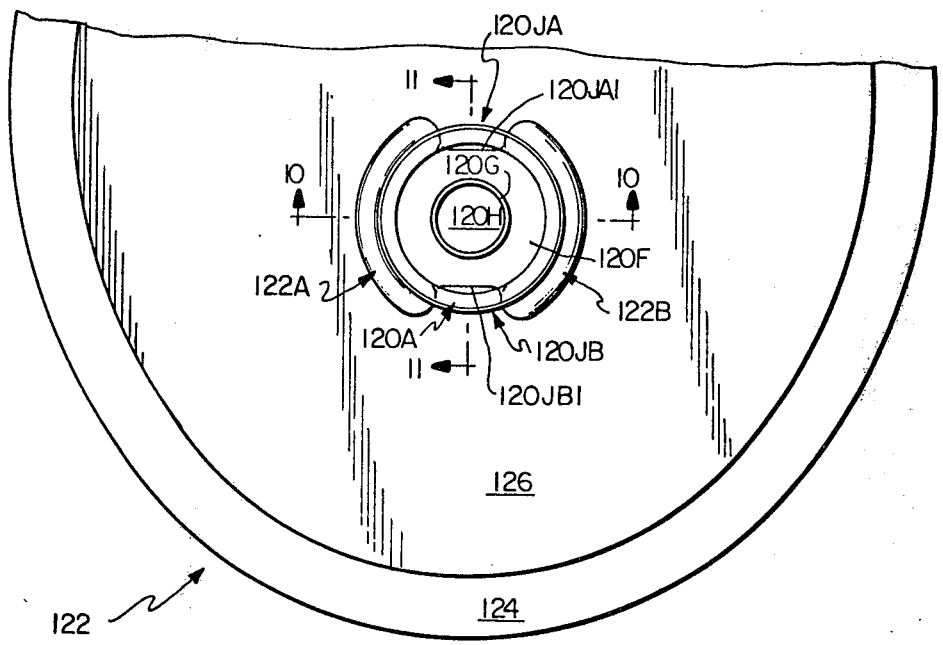
FIG. 9 is a top plan view of another preferred embodiment of a valve and container lid structure of the present invention.
Figure 10:
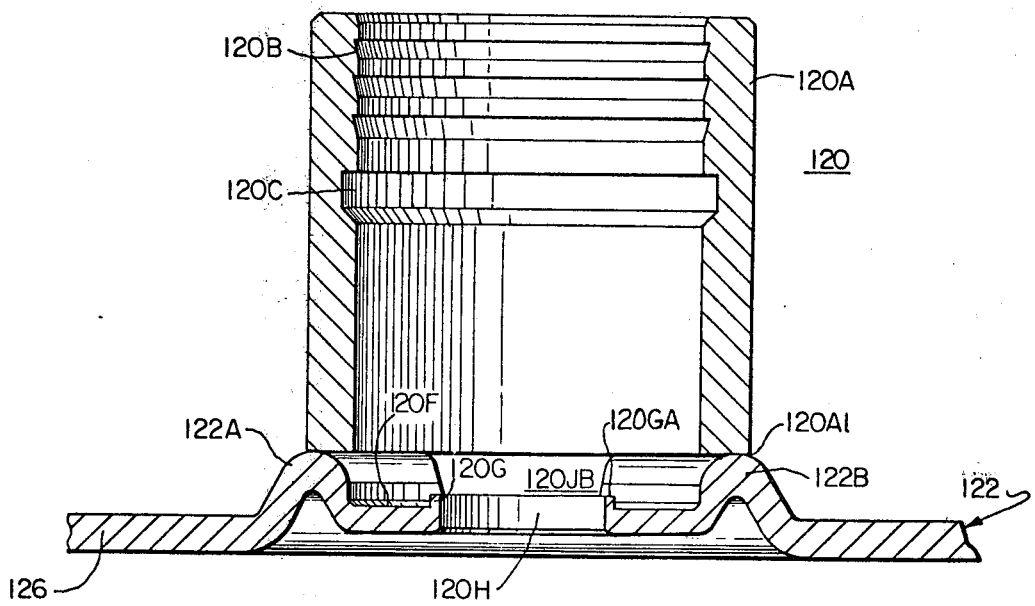
FIG. 10 is a detailed cross section taken along line 10—10 of FIG. 9 illustrating an integral portion of the valve assembly formed in the container lid.

Referring now to FIGS. 9, 10 and 11, another preferred embodiment of the relief valve of the present invention will now be described with respect to the configuration of the valve body 20A and the container lid 22 in which it is mounted. The valve poppet assemblies 20K, 20KA, the valve spring VS and the valve spring retainer clip 20D are all identical to those already described with reference to FIGS. 1-8 and 12 and will not be shown in connection with FIGS. 9, 10 and 11 for the sake of simplicity.

In this embodiment, the fabrication of the valve body is simplified in that instead of a closed end, stepped-down, cylindrical tube, the cylindrical tube comprising the valve body of the embodiment of FIGS. 9, 10 and 11 is open at both ends and the valve seat and drain ports are integrally formed in the lid of the container.

Specially, reference is now made to FIG. 9, 10 and 11 in which parts having like functions (albeit different structures) from those of FIGS. 1-8 will be identified by like numerals with the prefix one hundred (100).

The relief valve body 120A of the relief valve assembly 120, the latter being shown without the retainer spring and poppet thereof, is shown as including the one-way retainer slots 120B and the inboard retainer recess 120C as previously described with respect to the elements 20B and 20C in FIG. 2. The basic cross sectional configurations of the retainer slot 120B and the conformal retaining recess 120C are clearly shown in FIG. 10.

The lower portion of the valve body 120A terminates in a right angular cut defining a sharp bottom edge 120A1 on the valve body 120A and the 120A1 is welded to first and second arcuate convex dimples 122A and 122B which are disposed in symmetrical opposition about the center of a relief valve bore 120H. This bore 120H is formed with the annular raised curb 120G in the surface 126 of the container lid 122 which has been upset to provide the upstanding annular curb 120G and annular valve seat surface 120GA and its adjacent annular intermediate web 120F which is defined at its outer extent by the arcuate convex dimples 122A and 122B which are upset portions of that same surface 126 of the lid 122.

As previously taught with regard to the embodiment of FIGS. 1 and 2, there are provided a pair of drain ports which extend radially beneath the right angle bottom surface 120A1 of the valve body 120A between the ends of the convex upset dimples 122A and 122B so as to provide first and second drain openings 120JA and 120JB which are radially disposed along a common diameter. Further, as previously described, the lowermost extent of these drain ports 120JA and 120JB (the top to the lid surface 126) is beneath the annular valve seat 120GA and the intermediate web 120F at respective junctures 120J1A and 120J1B such that any liquid on the said valve seat and the web will flow outwardly through the drain ports and will not accumulate within the confines of the valve body 120A, thereby precluding the formation of bacteria within the valve body.

The resilient sealing discs 20K2, 20K2A and the lower annular shoulders 20K3, 20K3A of the valve poppets 20K, 20KA, respectively, each take up respective portions of the load exerted on the said valve poppets by the valve spring VS.

The compression of the resilient sealing disks 20K2, 20K2A against the raised annular valve seats 20GA, 120GA on the annular curbs 20G, 120G takes up a portion of the force exerted on the poppets 20K, 20KA by the valve spring VS. The remainder of this spring force is opposed by the engagement of the lower annular shoulders 20K3, 20K3A with the annular intermediate webs 20F, 120F.

The ratio of the amount of counter forces exerted by the sealing disks 20K2, 20K2A and the poppet shoulders 20K3, 20K3A and their respective abutments with the valve seats 20GA, 120GA and intermediate webs 20F, 120F is quite important for maximum reliability of the valve structure.

If, for example, too much of the load of the valve spring VS is assumed by the sealing disks 20K2, 20K2A then they tend to stick on the valve seats 20GA, 120GA and create higher cracking pressures than desired.

It has been established experimentally that the characteristics the valve spring VS and sealing disks 20K2, 20K2A should be chosen such that the sealing disks are compressed just enough to effectively seal the vent port 20H, 120H over the desired range of operating pressures.

The thickness and compressibility of the sealing disks 20K2, 20K2A thus determine how much counter force is generated against the raised curb 20G and the valve seat 20GA by the compression of the said disks before the annular shoulders 20K3, 20K3A engage the intermediate web 20F to generate the necessary remaining counter force to the valve spring VS. Thus, the initial, unstressed displacement between the sealing disks 20K2, 20K2A and the annular shoulders 20K3, 20K3A of the valve poppets 20K, 20KA are another design parameter for establishing the proper ratio of counter forces in the poppet assembly for opposing the valve spring VS.

For example, in a compressible material suitable for sealing a valve seat such as 20GA for cracking pressures on the order of 100 psi to 130 psi, the raised curb 20G should compress the disk 20K2 on the order of 0.020 inches over the area of contact with the valve seat 20GA.

The free board or freedom of movement afforded the valve poppets 20K, 20KA within the interior of the valve body 20A, 120A is provided by having the inside diameter of the said valve bodies and the maximum diameter of the valve poppets differ, for example, on the order of 0.01 inches. Thus, the fit is relatively close to properly guide the poppet up and down against the action of the spring VS while at the same time providing sufficient freedom of movement to permit for thermal expansion and contraction depending upon environmental conditions. Further, while the preferred valve poppet shapes are triangular and rectangular as shown, poppets with cylindrical or other shapes are also contemplated.

Likewise, the spring fingers or arcuate detents 20D1–20D4 on the spring retainer clip 20D permit expansion and contraction of the molded nylon retainer 20D within the bore of the valve body 20A and the force fit of the spring fingers into the retaining groove 20C and the additional action of the one-way grooves 20B tend to preclude undue movement or backing out of the retainer clip 20D from the valve body 20A, 120A. This advantage is in addition to the fact that in order for the valve poppet to be reached to override the action of the relief valve in its normal automatic mode of operation, one must destroy the retainer clip 20D in order to gain access to the interior of the valve body 20A, 120A.

In operation, referring primarily to FIG. 2 which typifies the relationship between the valve poppet 20K, the relief port 20H, the valve spring VS and the retainer clip 20D, and the relative position of the valve seat 20GA, intermediate web 20F and the drain ports 20J, excess pressure within the container lid acting through the valve port 20H against the resilient sealing disk 20K2 within the confines of the curb 20G and valve seat 20GA will overcome the action of the spring VS and lift the valve poppet 20K and sealing disk 20K2 off the valve seat 20GA and also lift the annular shoulders 20K2A off of the intermediate web 20F. Therefore, pressurized contents beneath the surface 26 of the container lid will be ejected around the valve poppet 20K over the seat 20GA and intermediate web 20F and out through the drain ports 20J. If the flow is sufficiently severe, it can also exhaust through the central bore 20D9 and the relieved portions 20D5–20D8 of the spring retainer clip 20D.

After such an emission of unduly pressurized contents, if it is desired to re-use the container lid or to clean the container lid and relief valve assembly in the first instance, then steam or hot cleaning liquid may be emitted directly downward into the valve body 20A through the central bore 20D9 of the spring retainer clip 20D and completely sterilize the interior of the valve body 20A including the external surfaces of the poppet 20K, the spring VS and the exposed portions of the intermediate web 20F. Then, upon removal of the injection equipment for the cleaning fluid or steam, the remaining fluid or condensate within the valve body 20A can flow outwardly from the intermediate web 20F through the drain ports 20J because of the difference in height at the demarcation point 20J1 of the drain port 20J and the intermediate web 20F. Therefore, no fluid will remain within the valve body and the sterilization will be complete. The absence of any remaining or residual fluid within the valve body 20A will preclude the growth of bacteria therein.

As can be readily seen from the foregoing specification and drawings, the present invention provides a new and novel vent valve for pre-mixed beverage and syrup containers which satisfies a need in the art for a valve that is tamper proof, readily cleanable and sanitary, is low in cost, easy to assemble and readily controllable to provide desired cracking pressure and relief capacities.

It should be understood that the apparatus of the present invention may be modified as would occur to one of ordinary skill in the art without departing from the spirit and scope of the present invention.

I claim:

1. Sanitary pressure relief valve and lid means for liquid product containers comprising:
    a central web in said lid having a raised annular valve seat surface formed therein and a relief port through said valve seat surface and said web, said web further comprising an annular intermediate web surface surrounding said raised seat surface;
    at least a pair of spaced arcuate bosses integrally formed in said lid and raised above said annular valve seat surface and said intermediate web surface and partially enclosing said intermediate web surface;
    a tubular valve body having one end open and its other end integrally affixed to said arcuate bosses and defining, with said bosses, drain ports for communicating the annular web surface with the exterior of said valve body;
    valve poppet means selectively closing said relief port seated on said annular valve seat;
    valve spring means in said valve body engaged with said poppet;
    spring retainer means inserted in said one open end of said tubular valve body maintaining said valve spring means in engagement with said valve poppet means;
    said spring retainer means including access ports formed therein for admitting cleaning fluids to the interior of said valve body to sterilize said relief valve assembly; and
    said drain ports acting to drain said cleaning fluids and condensates thereof from said relief valve assembly.

2. The invention defined in claim 1, wherein said valve poppet is basically cylindrical with flattened axially extending side surfaces about its periphery adjacent said drain ports and said valve seat to enhance drainage and preclude entrapment of fluids and condensates between said poppet and said valve body.

3. The invention defined in claim 1, wherein said spring retainer means comprises a one-way interlocking resilient clip having locking detent means extending into said valve body; and wherein said valve body includes integral internal locking means conformally shaped to receive said detent means to preclude intact removal of said clip from said valve body.

4. The invention defined in claim 1, wherein said valve poppet means comprises a poppet body having a downwardly directed cylindrical recess defined therein, a resilient compressible disk means carried in said cylindrical recess for engaging said valve seat and an annular shoulder surrounding said disk means and said recess; and wherein said resilient disk means is seated on said raised annular valve seat and said annular shoulder is seated on said intermediate web surface surrounding said raised annular valve seat in the closed condition of said relief port.

5. The invention defined in claim 4, wherein said resilient disk means is compressed on said annular valve seat by said valve spring to generate a first counter force opposing said valve spring and said annular shoulder engages said intermediate web surface to generate a second counter force sufficient to fully oppose the force of said valve spring.

6. The invention defined in claim 5, wherein said resilient disk means is recessed within said annular shoulder; and wherein said annular valve seat includes raised curb means for maintaining said valve seat above said intermediate web surface and within said annular shoulder in the closed condition of said relief port.

* * * * *